(12) United States Patent
Markusson

(10) Patent No.: US 8,109,233 B2
(45) Date of Patent: Feb. 7, 2012

(54) METHOD FOR COLLECTING MILK IN A MILK TANK, MILKING SYSTEM AND COMPUTER PROGRAM PRODUCTS

(75) Inventor: Ola Markusson, Huddinge (SE)

(73) Assignee: DeLaval Holding AB, Tumba (SE)

( * ) Notice: Subject to any disclaimer, the term of this patent is extended or adjusted under 35 U.S.C. 154(b) by 301 days.

(21) Appl. No.: 12/450,073

(22) PCT Filed: Apr. 2, 2008

(86) PCT No.: PCT/SE2008/000241
§ 371 (c)(1),
(2), (4) Date: Sep. 10, 2009

(87) PCT Pub. No.: WO2008/121050
PCT Pub. Date: Oct. 9, 2008

(65) Prior Publication Data
US 2010/0089324 A1 Apr. 15, 2010

(30) Foreign Application Priority Data
Apr. 3, 2007 (SE) .................................... 0700827

(51) Int. Cl.
*A01J 5/007* (2006.01)
(52) U.S. Cl. .................................. 119/14.02; 119/14.08
(58) Field of Classification Search ............... 119/14.01, 119/14.02, 14.03, 14.08, 14.14, 14.18, 14.17
See application file for complete search history.

(56) References Cited

U.S. PATENT DOCUMENTS

| | | | |
|---|---|---|---|
| 3,841,756 A | 10/1974 | Grochowicz | |
| 5,704,311 A * | 1/1998 | van den Berg | 119/14.02 |
| 5,743,209 A * | 4/1998 | Bazin et al. | 119/14.08 |
| 5,866,804 A | 2/1999 | O'Keeffe | |
| 6,038,030 A | 3/2000 | Van den Berg | |
| 6,823,817 B2 * | 11/2004 | van den Berg et al. | 119/14.02 |
| 6,971,330 B2 * | 12/2005 | Nilsson | 119/14.02 |
| 7,240,635 B2 * | 7/2007 | Bosma et al. | 119/14.15 |
| 7,997,228 B2 * | 8/2011 | Eriksson | 119/14.08 |
| 2004/0154548 A1 * | 8/2004 | Eriksson | 119/14.08 |
| 2005/0126498 A1 * | 6/2005 | Bosma | 119/14.02 |

FOREIGN PATENT DOCUMENTS

| | | |
|---|---|---|
| EP | 0 399 604 | 11/1990 |
| EP | 0 628 244 | 12/1994 |
| EP | 0797 915 | 10/1997 |
| WO | WO 0027183 | 5/2000 |
| WO | WO 03094602 | 11/2003 |

* cited by examiner

*Primary Examiner* — T. Nguyen
(74) *Attorney, Agent, or Firm* — Young & Thompson

(57) ABSTRACT

The invention relates to a method for collecting milk in a milk tank. The method comprises the steps of: milking a milking animal of a herd of milking animals by means of a milking station; establishing a quality parameter for the milk obtained from the milking animal during the milking; estimating a quality level of the total amount of milk in a milk tank connected to the milking station, wherein the estimation is based at least on the quality parameter; and collecting, in the milk tank, the milk obtained from the step of milking if the result from the estimation indicates that the quality of the total amount of milk in the milk tank would then result in a desired quality level. The invention also relates to computer program products and a milking system.

20 Claims, 1 Drawing Sheet

METHOD FOR COLLECTING MILK IN A MILK TANK, MILKING SYSTEM AND COMPUTER PROGRAM PRODUCTS

FIELD OF THE INVENTION

The invention relates to the field of automatic milking of animals, and in particular to a method for collecting milk in a milk tank based on its quality. The invention also relates to a milking system and computer program products for implementing the method.

BACKGROUND OF THE INVENTION

The milk from a milking animal, such as a cow, is of a certain quality. The milk quality can be defined in different ways, such as for example in terms of its fat content or as having a certain cell count value. Further, the quality level may depend on various factors, for example the feed she is given, her health, her age, stage of lactation, or intervals between milking occasions, to mention a few factors. Besides such environmental factors, the milk quality also depends on genetic factors; the potential fat content of milk from an individual cow is to some extent determined genetically, as are protein and lactose levels.

Depending on its quality, the milk is suitable for different purposes, for example suitable for producing different types of milk-related products. The milk can e.g. be adequate either for direct consumption, for the processing into high-quality products such as cheese, butter or yogurt, for feeding calves or it may be totally unfit for any use.

There are a number of regulations to follow, in which the quality level required for a certain use is stated. For example, it may be regulated that the somatic cell count has to be below a value of 400,000 cells/ml in order for the milk to be consumed by people.

Today, when a farmer delivers an amount of milk to a dairy producer he can obtain an indication of the milk quality as measured by the dairy producer. Alternatively, he may manually measure the quality of the milk in the milk tank at any desired point of time.

SUMMARY OF THE INVENTION

However, it would be advantageous to be able to predict and even control the quality of the milk to be delivered so that the quality aimed at is achieved and so that the milk is thereby indeed suitable for a particular desired use. For example, for a farmer wishing to obtain milk suitable for producing a certain kind of cheese it would be desirable to be able to ensure that the milk to be delivered indeed has a quality level that fulfils the requirements for this intended purpose.

It is therefore a general object of the invention to provide means for enabling a user, such as a farmer, to control, or regulate the quality of milk to be delivered.

It is another object of the invention to provide means for enabling a user to optimize the use of milk produced in a dairy farm.

It is yet another object of the invention to provide means for enabling a prediction of the quality of the milk from a number of identified milking animals. In particular, it is an object of the invention to provide means for estimating/predicting in advance how the milk of a particular milking animal would affect the quality level of the total amount of milk from all milking animals.

It is yet another object of the invention to provide means for collecting the milk in a milk tank in dependence on the quality of the milk and in dependence on the prediction.

These objects, among others, are obtained by a method, by a milking system and by computer program products as claimed in the independent claims.

In accordance with the invention, a method is provided for collecting milk in a milk tank. The method comprises the steps of: milking a milking animal of a herd of milking animals by means of a milking station; establishing a quality parameter for the milk obtained from the milking animal during the milking; estimating a quality level of the total amount of milk, from a plurality of animals, in a milk tank connected to the milking station, wherein the estimation is based at least on the quality parameter; and collecting, in the milk tank, the milk obtained from the step of milking if the result from the estimation indicates that the quality of the total amount of milk, from a plurality of animals, in the milk tank would then result in a desired quality level. By means of the invention, a farmer may estimate in advance how the milk from a particular milking animal would affect the quality level of the milk that have already been milked and collected in a milk tank. He may thereby decide whether or not to discard the milk from this particular animal. Further, a farmer wishing to deliver milk of a certain quality, for example suitable for human consumption, can thereby make sure that the milk has indeed the quality required for the intended purpose.

In accordance with an embodiment of the invention, the method comprises the further step of predicting the milk quality of the milk in the milk tank when the milk tank is full. This prediction can be based on individual data for all milking animals of a herd. The step of collecting may then be based also on the prediction. A tool for affecting and controlling the milk quality is thereby provided, and a farmer wishing to deliver milk suitable for a certain type of cheese can be sure to be able to deliver milk of a quality fulfilling requirements for such use. In particular, a farmer may predict in advance how the milk from the particular milking animal would affect the quality level of the milk that have already been milked and collected in a milk tank and also how the milk quality from the remaining milking animals to be milked will affect the quality. He may thereby, for example, decide to collect the milk from this particular animal in the milk tank, even though the milk is of lower quality. An optimized usage of milk is thereby provided.

In accordance with another embodiment, the milk quality parameter is a cell-count value and the step of establishing a milk quality parameter comprises performing a cell count measurement. The cell count measurement can be automatically or manually performed. This is a convenient means for establishing a milk quality parameter. The cell count value also provides an excellent reliability of the estimation result of the milk quality of milk tank when full.

In accordance with yet, another embodiment, the method comprises the step of identifying the milking animal and the step of establishing a milk quality parameter comprises estimating a cell-count value based on historical data for the identified milking animal. This provides a non-expensive and simple means for establishing the milk quality parameter, yet having a satisfactory reliability.

In accordance with still another embodiment, the step of estimating comprises utilizing a mathematical function having as input one or more of following parameters: the number of times each milking animal is milked each day, an estimated cell count value for one or more milking animals, a measured cell count value for one or more milking animals, the volume of milk obtained at each milking occasion, the volume of the milk tank. Easily obtainable parameters can thus be used for estimating the milk quality of the milk in the milk tank.

In accordance with yet another embodiment, the method comprises the further step of collecting the milk from the milking animal in another milk tank if the result from the estimation indicates that the quality of the milk in the milk tank would fall below the desired quality level. The milk from this other milk tank may then be suitable for a different use. Further, if the milk is totally unsuitable for any use, the milk can be led to a drain. Further yet, the desired quality level is preferably chosen so as to obtain milk of a quality suitable for an intended use. An optimization of the milk usage can thereby be provided.

In accordance with a further aspect of the invention computer program products are provided, whereby advantages similar to the above are achieved. In particular, the invention may thereby easily be implemented in already existing milking systems.

Further characteristics of the invention and advantages thereof will be evident from the detailed description of embodiments of the present invention given hereinafter and the accompanying figures, which are only given by way of illustration.

DETAILED DESCRIPTION OF THE INVENTION

Figure 1:
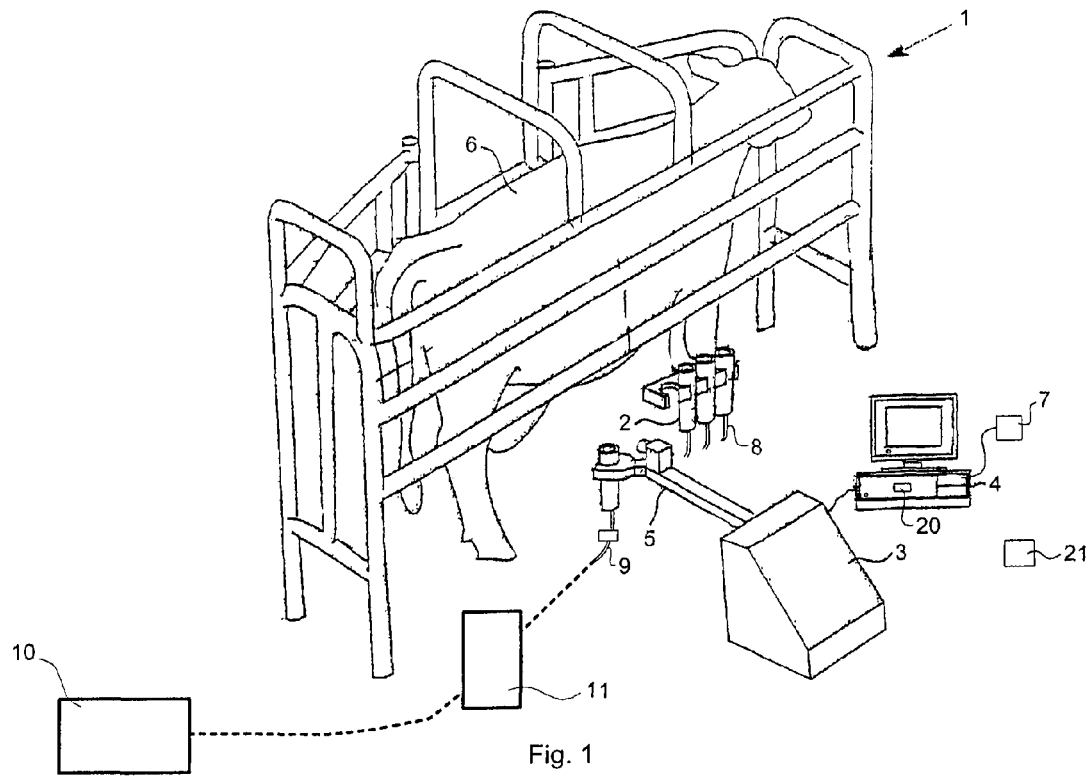
FIG. 1 illustrates a milking system in which the present invention may be implemented.

FIG. 1 illustrates schematically a milking system in which the present invention may be implemented. Only parts relevant for understanding the present invention are mentioned in the following. It is realized that the milking system comprises other parts as well.

The milking system comprises one or more milking station(s) 1 suitable for voluntary milking of cows. In such voluntary milking system the freely walking cow enters the milking station 1 in order to be milked on a voluntary basis. The milking system 1 comprises an automatic milking machine (not explicitly illustrated) including teat cups 2 connected to an end unit 11 (not shown to scale) by means of milk lines, part of which are shown at 8. From the end unit 11, the milk is directed via milk lines (schematically indicated by dashed lines) to a milk tank 10. The milk tank 10 is not shown to scale, and may in a typical case be dimensioned to hold milk from all the milking animals of a herd obtained during one or two days. All milking stations 1 of the milking system are typically connected to the milk tank 10.

The milking station 1 further comprises a milking robot or automatic handling device 3 including a processing and control device 4 and a robot arm 5. The milking robot 3 is arranged to automatically apply the teat cups 2 of the milking machine to the teats of a cow 6.

The processing and control device 4 is responsible for processing and controlling various actions in the milking station 1, such as activities in connection with the milking e.g. opening and closing of gates, controlling the milking machine and its handling device 3. The processing and control device 4, in the following denoted computer 4, typically comprises a microcomputer and suitable software. The computer 4 further preferably comprises a database 7 including information about each of the cows milked by the milking machine, for example information about when the respective cow was last milked, when the cow was last fed, the milk production of the cow etc. The database 7 is continuously updated and contains data relating to the individual cows in the milking herd. In the figure the database 7 is shown as a separate entity, it may however be integrated with the computer 4.

The milking station 1 further comprises means for establishing a quality parameter for the milk obtained from the first milking animal. An example of such means comprises an on-line somatic cell counter or other somatic cell counter. In the following such somatic cell counters are denoted simply cell counter.

Figure 2:
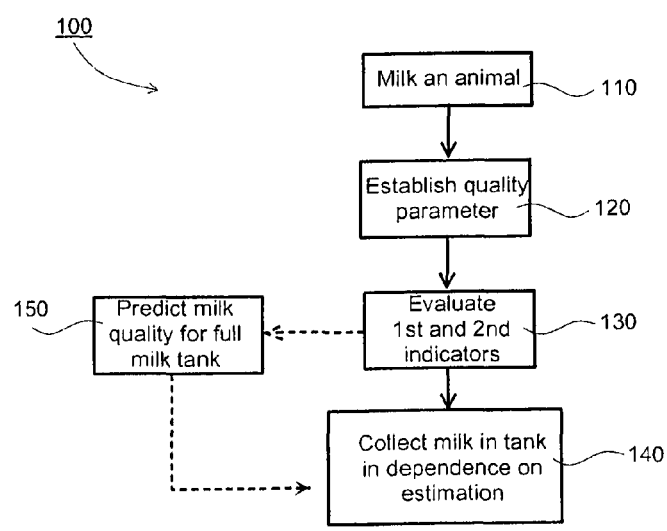
FIG. 2 illustrates a flow chart of steps included in a method in accordance with the invention.

The method in accordance with the invention is next described with reference to FIG. 2. In the method 100 a milking animal that has entered the milking station 1 is milked (step 110) by means of the automatic handling device 3 of the milking station 1.

A quality parameter is then established, in step 120, for the milk obtained from the milking animal. For example, a quality parameter in the form of a cell count value (number of cells/mL) may be established by means of the cell counter.

Thereafter, in step 130, the quality level of the total amount of milk in the milk tank 10 is estimated. This step is described more in detail later.

In step 140, the milk is collected in the milk tank 10 in dependence on the result of the estimation. In particular, if the estimation reveals that the quality of the milk in the milk tank would decrease dramatically and result in that the milk would not be suitable for the intended use, then the milk may be directed to a drain or to another milk tank (not shown). If, however, the result from the estimation indicates that the milk in the milk tank 10 would obtain a desired quality level, then the milk is collected in the milk tank 10.

Reverting to step 130, the estimation may be performed in any suitable manner. In the following, the cell count value is taken as an example of the quality parameter. It is however noted that other quality parameters could be used.

In an embodiment of the invention, the cell count measurement, i.e. the establishment of the quality parameter, is performed at each milking occasion. The cell count value for the total amount of milk in the milk tank is then given by $$C_{tot} = \frac{\sum_i V_i \cdot C_i}{\sum_i V_i} \qquad (1)$$

where $C_{tot}$ is the total cell count of the milk tank 10, $V_i$ is the amount of milk from milking occasion i and $C_i$ is the cell count of the milk from milking occasion i. In this example, the cell-count value is established for each milking, which may be both time-consuming and expensive. However, the accuracy of the result, i.e. the estimated quality level of the milk in the milk tank 10, is very high.

In another embodiment, a cell count measurement is not performed at each milking occasion, but only at selected occasions. Instead, an estimated cell count value for the particular, identified cow is provided. Such estimated cell-count value can be based on historical data, for example historical cell count results. All previously performed cell count results for the individual cow are preferably stored in the database 7 or the like. The data is accessible by means of the computer 4 connected to the automatic milking station 1. When the cow enters the automatic milking station 1 she is identified and the relevant data for this particular cow is retrieved and the quality parameter is calculated based on the previous cell count values. As an example, if the cow is milked three times a day, the quality parameter for the milk from two of the milking occasions may be estimated based on historical data and an actual cell count measurement may be made for the milk from the third milking occasion. It is realized that the result in this case is not as accurate as in the previous embodiment, but highly satisfactory results is nevertheless obtained.

In yet another embodiment of the invention, the amount of milk in the milk tank for which a cell count measurement has been made can be kept track of. This can be used as an indication of the accuracy of the quality level of the milk in the milk tank 10. If all milk in the milk tank 10 has undergone a cell count measurement, then the accuracy may be rated close to 100%.

In another embodiment of the invention, the quality of the milk in the milk tank 10, when the milk tank 10 is full, is estimated in advance. Such estimation, or prediction really, may be based on individual data for all the cows in a herd. This is illustrated in FIG. 2 as step 150, which is an optional step.

In the following a simple example is used for illustrating the prediction and optimizing part of the invention (step 150). In this example, assume that a farmer has five cows. The amount of milk from the cows does not differ that much from milking occasion to milking occasion, so the amount of milk $V_1, V_2, V_3, V_4, V_5$ from each cow can be estimated with a relatively high accuracy. It is also to be noted that the amount is easily measured and that the calculations may be corrected when the milking is actually performed if there is a difference between the estimated value and the measured value.

The milk quality $C_1, C_2, C_3, C_4, C_5$ for milk from each respective cow may be estimated by means of historical cell count values. $C_i$ may for example be an average of the latest x cell count results, e.g. based on the latest 3 cell count results:

$$C_i = \frac{C_{morning} + C_{midday} + C_{evening}}{3}$$

The predicted milk quality for the total amount of milk obtained during a single day, when the cows are milked 3 times during that day, may then be calculated as:

$$C_{tot}(\text{day 1}) = 3 * \left( \frac{V_1 \cdot C_1 + V_2 \cdot C_2 + V_3 \cdot C_3 + V_4 \cdot C_4 + V_5 \cdot C_5}{V_1 + V_2 + V_3 + V_4 + V_5} \right)$$

The milk tank may for example have a volume suitable for the milk from all milking occasions during two days.

Thus, $$C_{tot}(\text{full milk tank}) = 2 * 3 * \left( \frac{V_1 \cdot C_1 + V_2 \cdot C_2 + V_3 \cdot C_3 + V_4 \cdot C_4 + V_5 \cdot C_5}{V_1 + V_2 + V_3 + V_4 + V_5} \right)$$

Now assume that the desired quality of the milk for the full tank is set to a certain value, $C_{target}$. $C_{tot}$ should not be allowed to exceed $C_{target}$. One simple way to ensure this is to perform a cell count measurement for each cow and if the measured value exceeds the predicted value for a certain cow, then the milk is not used, i.e. is not collected in the milk tank.

However, it may happen that the milk actually obtained from one cow is of much better quality than what the expected milk quality value, $C_i$, indicates. Then the milk from another cow, having a lower than expected milk quality may be, used anyway, without the total amount of milk in the milk tank 10 when full exceeding the target value $C_{target}$.

The farmer may thus use a suitable algorithm for optimizing the amount of milk without exceeding the target value $C_{target}$. That is, he may minimize the amount of milk that has to be discarded.

It is not necessary to perform cell count values for each and every milking occasion, but the fewer cell counts the lower accuracy.

The estimated cell count values may be weighted in dependence on how accurate the value is believed to be. For example, the accuracy of an estimated cell count value for a cow for which no cell count measurements have been made for some time may be set somewhat lower than cell count values from other cows, which have more recent measurement values.

The above calculations and idea may of course easily be extended to any number of cows owned by the farmer. The dilution effect may be used to a larger extent the higher the number of cows is. Further, it is noted that other algorithms than the one used to illustrate the invention may be utilized. For example, an algorithm based on one or more of: the number of times each milking animal is milked each day, an estimated cell count value for one or more milking animals, a measured cell count value for one or more milking animals, the volume of milk obtained at each milking occasion, the volume of the milk tank.

The decision whether or not to collect the milk from a certain, identified cow in the milk tank 10 may then be based on the prediction. The prediction may, in an embodiment of the invention, be continuously updated after each milking occasion. For example, if the amount of milk actually obtained from a cow is measured and found to differ substantially from the predicted amount, then the prediction may be updated accordingly.

An example of an algorithm that could be used for optimizing the milk quality and milk usage is given in the following:

$$\hat{C} = \frac{\sum_{}^{done} C_i V_i \alpha_i + \sum_{}^{to\_be\_done} \tilde{C}_i \tilde{V}_i \beta_i}{\sum_{}^{done} V_i + \sum_{}^{to\_be\_done} \tilde{V}_i}$$

where:
$\hat{C}$=is the estimated quality
$C_i$=is the measured/estimated cell counts of milkings already performed
$V_i$=is the yield of milkings already performed
$\alpha_i$=is an uncertainty factor related to e.g. milking intervals
$\tilde{C}_i$=estimated cell counts of milkings to be done before the next emptying of the milk tank
$\tilde{V}_i$=estimated yield of these milkings to be performed
$\beta_i$=uncertainty factor, could depend on the same factors as $\alpha_i$, or e.g. on variations in historical values (for example variations of cell counts or amount of milk)

If there is no uncertainty, then $\alpha_i=\beta_i=1$. However, if there is some uncertainty, then $\beta_i \leq 1$ and $\alpha_i > 1$. This is only an exemplary algorithm. Other algorithms or modifications of the above exemplary algorithm may alternatively be used.

The present invention is suitable for implementation in an automated milking stall, but it can be implemented in any type of milking plant, i.e. a more or less manually performed milking or a semi-automated or fully automated milking environment. For example, a cell count measurement can be performed fully automatically or manually. If the cell count measurement is performed manually, the result is then inputted to the computer 4 or in another way made available for use in the method.

In another embodiment, the farmer wishes to obtain as high quality of the milk as possible and removes the milk from all cows having a cell count value (measured or estimated) above a certain level.

The invention is also related to a computer program product 20 that is loadable into an internal memory of a computer that is used for controlling the milking station. The computer program product 20 comprises software code portions for carrying out the method described above, when the computer program product is run on the computer. The invention is thus easily implemented in already existing milking systems.

The computer program product may alternatively be stored on a computer readable storage medium 21, for example a compact disc. The computer readable storage medium 21 comprises computer readable program code means for causing the computer of the milking station to carry out the method described above.

Further, the invention also relates to a milking system. The milking system described in connection with FIG. 1 comprises, besides the parts already described, a second milk tank, to which milk of different quality may be directed. The milking system also comprises means for establishing a quality parameter for the milk obtained from the milking animal, for example a cell counter. Further yet, the milking system comprises means for estimating a quality level of the total amount of milk in the milk tank 10. Such means may be implemented by means of the above-mentioned computer program products. Lastly, the milking system comprises means for directing the milk obtained from the milking occasion to the milk tank 10 or to the second milk tank in dependence on a result from the estimation. Such means could for example comprise a simple three-way valve, the function of which is controlled, for example, by means of the computer 4.

Throughout the description the cell count value has been used as an example of how to measure or define the quality of the milk. It is to be noted that other parameters could be used for defining a desired and actual quality level or quality value. For example, the quality level could be based on the fat content, the melatonine content, the lactose level or the protein content of the milk.

Further, throughout the description cows have been used as an example of milking animals. It is to be noted that the invention may be implemented for any kind of lactating animals.

In summary, the present invention provides a method for predicting the quality of milk in a milk tank. The milk in the milk tank may for example be delivered to a dairy producer intending to produce a certain type of cheese. The method provides a way for the farmer to ensure that the milk to be delivered to the dairy producer indeed fulfils quality requirements for this intended use.

The invention claimed is:

1. A method for collecting milk in a milk tank, said milk tank being connected to at least one milking station comprising means for milking a milking animal, comprising:
    milking a milking animal of a herd of milking animals by means of said milking station,
    establishing a quality parameter for the milk obtained from said milking animal during said milking, estimating a quality level of the total amount of milk in said milk tank, wherein the estimation is based at least on said quality parameter,
    collecting, in said milk tank, the milk obtained from said step of milking if the result from said estimation indicates that the quality of the total amount of milk, from a number of animals, in said milk tank would then result in a desired quality level, and
    predicting the milk quality of the milk in said milk tank when full, based on individual data for all milking animals of said herd, wherein said step of collecting is based also on said prediction.

2. The method as claimed in claim 1, wherein said milk quality parameter is a cell-count value and said step of establishing a milk quality parameter comprises performing a cell-count measurement.

3. The method as claimed in claim 2, wherein said cell-count measurement is performed automatically.

4. The method as claimed in claim 2, wherein the amount of milk in the milk tank for which a cell count measurement has been made is registered and updated continuously.

5. The method as claimed in claim 4, wherein said amount of milk is utilized for calculating an indication of the accuracy of the quality level of the milk in the milk tank.

6. The method as claimed in claim 1, further comprising identifying said milking animal and wherein said step of establishing a milk quality parameter comprises estimating a cell-count value for the milk currently obtained from said milking animal during said milking based on historical data for the identified milking animal.

7. The method as claimed in claim 1, wherein said estimating comprises utilizing a mathematical function having as input one or more of following parameters: the number of times each milking animal is milked each day, an estimated cell count value for one or more milking animals, a measured cell count value for one or more milking animals, the volume of milk obtained at each milking occasion, the volume of the milk tank.

8. The method as claimed in claim 1, further comprising collecting the milk from said milking animal in another milk tank if the result from said estimation indicates that the quality of the milk in said milk tank (10) would fall below said desired quality level.

9. The method as claimed in claim 8, wherein said milk is suitable for a different use.

10. The method as claimed in claim 1, wherein said desired quality level is chosen so as to obtain milk of a quality suitable for a intended use.

11. A non-transitory computer program product loadable into an internal memory of a computer controlling a milking station, said computer program product comprising software code portions for carrying out all of the method steps as claimed in claim 1 when said computer program product is run on said computer.

12. A computer program product stored on a non-transitory computer readable storage medium, comprising non-transitory computer readable program code means for causing a computer of a milking station to carry out all of the method steps as claimed in claim 1.

13. A milking system comprising at least one milking station having a milking machine for milking a first milking animal and connection means to a first milk tank and a second milk tank, comprising:
    means for establishing a quality level, based a quality parameter, for the milk obtained from said first milking animal during a milking occasion,
    means for determining a current quality level of a current total amount of milk in said first milk tank from plural animals, wherein the estimation is based at least on said quality parameter,
    means for estimating a resulting quality level of a revised total amount of the milk to be in the first milk tank should the milk obtained from the first milking animal during said milking occasion be added to the milk currently within the first milk tank, based on i) the current quality level of milk currently within the first milk tank, and ii) the established quality level for the milk obtained from the first milking animal during said milking occasion; and means for directing the milk obtained from said milking of said first animal to said first milk tank when the result from the estimation of the resulting quality level of the revised total amount of milk in said first milk tank would result in a desired quality level, means for directing the milk obtained from said milking to said second milk tank if the result from the estimation of the resulting quality level of the revised total amount of milk in said first milk tank (10) would provide a quality level below the desired quality level.

14. A method for collecting milk in a milk tank, said milk tank being connected to at least one milking station comprising a milking machine for milking a milking animal, comprising the steps of:

using the milking machine, milking a first milking animal of a herd of milking animals at said milking station, the milking machine in controlled fluid communication with a milk tank;

estimating quality of the milk obtained from the first animal during said milking step and establishing a quality level, based on a quality parameter, for the milk obtained from the first milking animal during said milking;

based on i) a current quality level of milk currently within the milk tank, and ii) the estimated quality level for the milk obtained from the first milking animal during said milking, estimating a resulting quality level of a revised total amount of the milk to be in said milk tank should the milk obtained from the first milking animal during said milking be added to the current quality level of milk currently within the milk tank; and when the estimated resulting quality level indicates that the quality of the revised total amount of milk would be in a desired quality level, collecting the milk obtained from the first animal in said milking step into the milk tank.

15. The method of claim 14, wherein, when the estimated resulting quality level indicates that the quality of the revised total amount of milk would not be in a desired quality level, the milk obtained from the first animal in said milking step is diverted to a destination other than the milk tank.

16. The method of claim 14, wherein said milk quality parameter is a cell-count value and said step of establishing a milk quality level comprises performing a cell-count measurement.

17. The method of claim 14, further comprising the step of identifying said first milking animal and wherein said step of establishing the milk quality level for the milk obtained from the first milking animal during said milking comprises estimating a cell-count value based on historical data for the identified first milking animal.

18. The method as claimed in claim 17, wherein said estimating step comprises utilizing a mathematical function having as input one or more of following parameters: the number of times each milking animal is milked each day, an estimated cell count value for one or more milking animals, a measured cell count value for one or more milking animals, and the volume of milk obtained at each milking occasion.

19. The method as claimed in claim 14, wherein, in said step of using the milking machine and milking the first milking animal of the herd of milking animals at said milking station, the milk obtained during said milking step of the first animal is retained in a first unit, the first unit in controlled fluid communication with a milk tank, and when the estimated resulting quality level indicates that the quality of the revised total amount of milk would be in a desired quality level, collecting the milk obtained retained in the first unit, from the first animal in said milking step, into the milk tank.

20. A computer program product stored on a non-transitory computer readable storage medium, comprising non-transitory computer readable program code means for causing a computer of a milking station to carry out all of the method steps as claimed in claim 1.

* * * * *